US008934014B2

United States Patent
Lee et al.

(10) Patent No.: US 8,934,014 B2
(45) Date of Patent: Jan. 13, 2015

(54) ELECTRONIC DEVICE AND SWITCHING METHOD FOR THE SAME

(75) Inventors: Hou-Hsien Lee, Taipei Hsien (TW); Chang-Jung Lee, Taipei Hsien (TW); Chih-Ping Lo, Taipei Hsien (TW)

(73) Assignee: ScienBiziP Consulting(Shenzhen)Co., Ltd., Guangdong (CN)

( * ) Notice: Subject to any disclaimer, the term of this patent is extended or adjusted under 35 U.S.C. 154(b) by 456 days.

(21) Appl. No.: 12/965,187

(22) Filed: Dec. 10, 2010

(65) Prior Publication Data

US 2012/0069191 A1    Mar. 22, 2012

(30) Foreign Application Priority Data

Sep. 21, 2010    (TW) ................................ 99132114 A (51) Int. Cl.
*H04N 7/18*    (2006.01)
(52) U.S. Cl.
CPC .............. *H04N 7/181* (2013.01); *H04N 7/188* (2013.01)
USPC ........................................ 348/148; 348/159
(58) Field of Classification Search
None
See application file for complete search history.

(56) References Cited

U.S. PATENT DOCUMENTS

| 7,325,934 | B2 * | 2/2008 | Schofield et al. | 359/604 |
|---|---|---|---|---|
| 2006/0072014 | A1 * | 4/2006 | Geng et al. | 348/159 |
| 2007/0107029 | A1 * | 5/2007 | Monroe et al. | 725/105 |
| 2008/0288986 | A1 * | 11/2008 | Foster et al. | 725/62 |
| 2009/0079823 | A1 * | 3/2009 | Bellamy et al. | 348/143 |
| 2009/0160939 | A1 * | 6/2009 | Fernandez et al. | 348/158 |
| 2009/0225164 | A1 * | 9/2009 | Renkis | 348/143 |
| 2009/0231433 | A1 * | 9/2009 | Grigsby et al. | 348/149 |
| 2009/0237508 | A1 * | 9/2009 | Arpa et al. | 348/153 |
| 2009/0262192 | A1 * | 10/2009 | Schofield et al. | 348/148 |
| 2009/0262206 | A1 * | 10/2009 | Park | 348/218.1 |

* cited by examiner

*Primary Examiner* — Jay Au Patel
*Assistant Examiner* — Reza Aghevli
(74) *Attorney, Agent, or Firm* — Novak Druce Connolly Bove + Quigg LLP (57) ABSTRACT

A method for switching a monitored location of a plurality of image capture devices using an electronic device obtains a current direction of the electronic device, and determines a current image capture device corresponding to the current direction of the electronic device from the plurality of image capture devices. The method further sends a switch command to the current image capture device, receives captured images from the current image capture device, and displays the received captured images on a display screen of the electronic device.

16 Claims, 9 Drawing Sheets

ELECTRONIC DEVICE AND SWITCHING METHOD FOR THE SAME

BACKGROUND

1. Technical Field

Embodiments of the present disclosure relate to image capture technology, and particularly to an electronic device and switching method thereof.

2. Description of Related Art

Image capture devices can perform security surveillance by capturing images of monitored locations and transmit the captured images to a central computer. Actively monitored locations must be switched, however, by a controller installed in the central computer. Accordingly, it is inefficient to change the monitored locations. Therefore, an efficient method for switching the monitored locations is desired.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
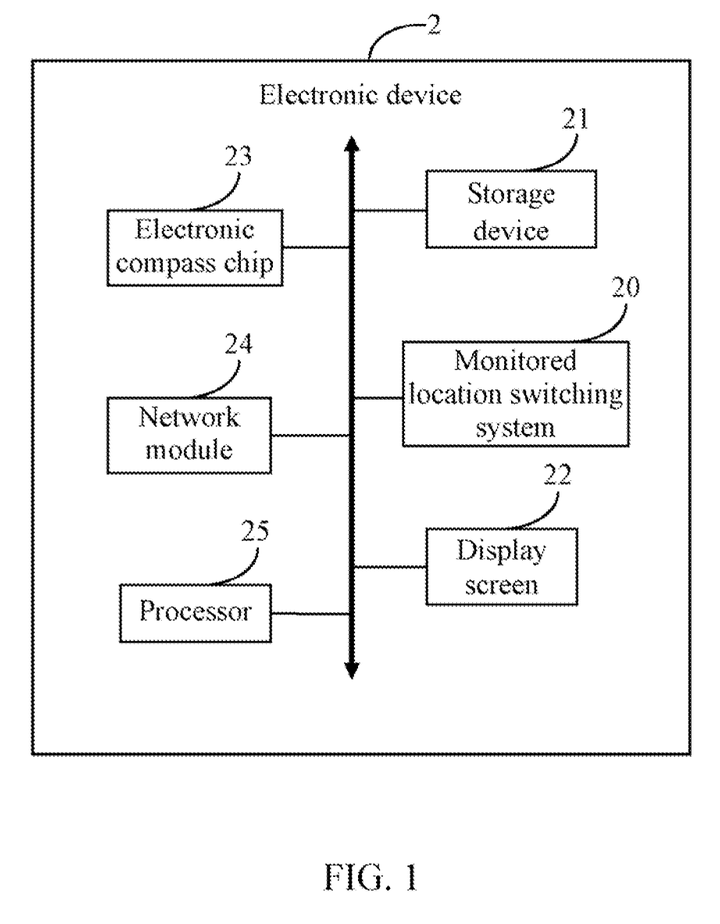
FIG. 1 is a block diagram of one embodiment of an electronic device.

FIG. 1 is a block diagram of one embodiment of an electronic device 2, including a monitored location switching system 20, a storage device 21, a display screen 22, an electronic compass chip 23, a network module 24, and at least one processor 25. The monitored location switching 20 may be used to detect movement data of the electronic device 2, and switch a monitored location of a plurality of image capture devices according to the movement data of the electronic device 2 through the network module 24. In one embodiment, the image capture devices monitor a location, and the monitored location may be monitored by different image captured devices using the electronic device 2. A detailed description will be given in the following paragraphs.

In embodiment, the display screen 22 may be a liquid crystal display (LCD) or a touch-sensitive display, for example. The electronic device 2 may be a mobile phone, a personal digital assistant (PDA) or any other suitable communication device.

In one embodiment, the monitored location switching 20 may include one or more modules. The one or more modules may comprise computerized code in the form of one or more programs that are stored in the storage device 21 (or memory). The computerized code includes instructions that are executed by the at least one processor 25 to provide functions for the one or more modules.

Figure 2:
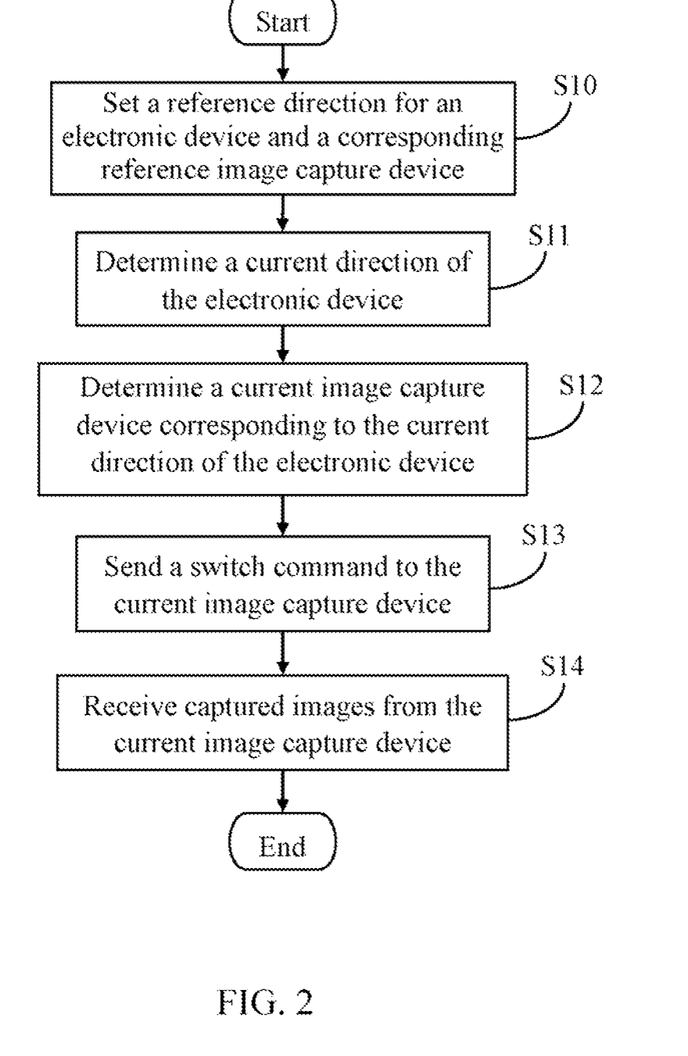
FIG. 2 is a flowchart of one embodiment of a method for switching a monitored location of a plurality of image capture devices using the electronic device in FIG. 1.

FIG. 2 is a flowchart of one embodiment of a method for switching a monitored location of a plurality of image capture devices using the electronic device 2 in FIG. 1. In one embodiment, the image capture devices monitor a location, and the monitored location may be monitored by different image captured devices using the electronic device 2. Depending on the embodiment, additional blocks may be added, others removed, and the ordering of the blocks may be changed.

Figure 6:
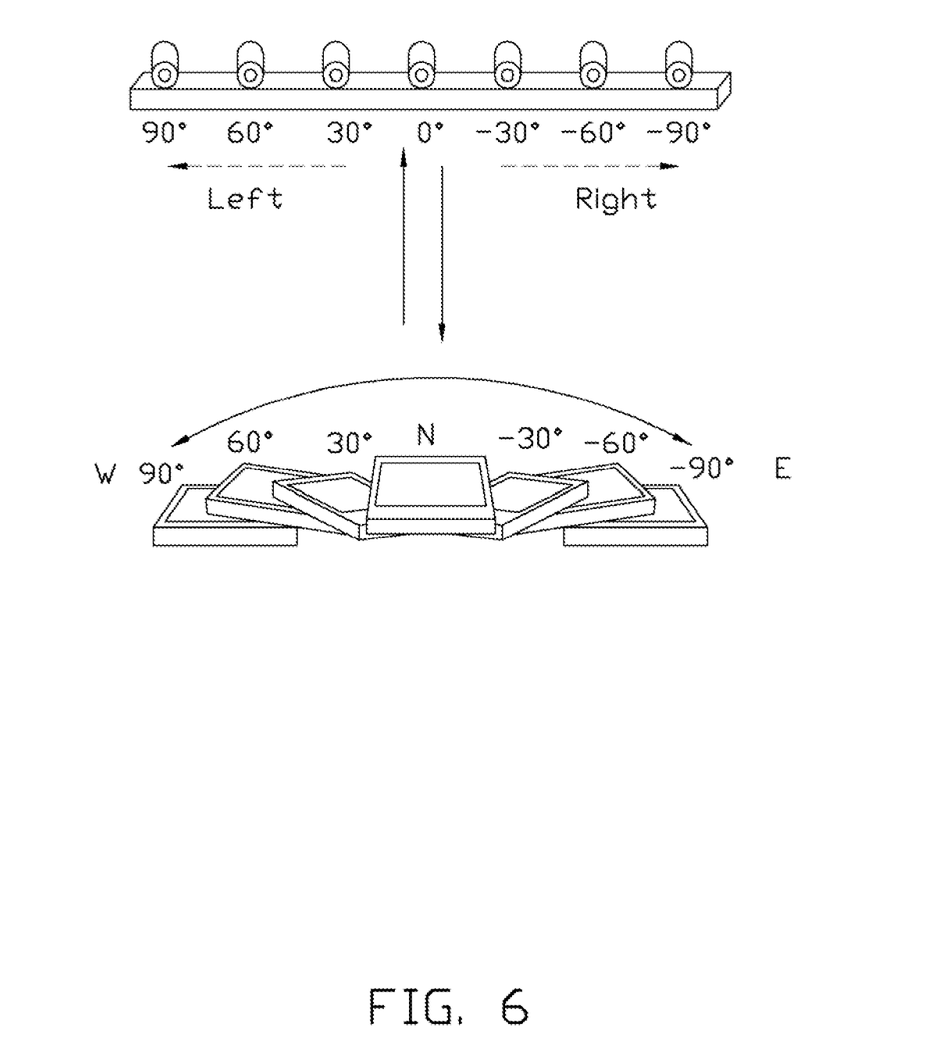
FIG. 6 is a schematic diagram of one embodiment of a reference direction of the electronic device.

In block S10, a reference direction of the electronic device 2 and a corresponding reference image capture device in an array of a plurality of image capture devices is set through a setting interface of the image source system 20. In one embodiment, the reference direction of the electronic device 2 is a reference point to the reference image capture device in the plurality of image capture devices. That is to say, if the electronic device 2 is toward the reference direction, the electronic device 2 obtains captured images from the reference image capture device. Referring to FIG. 6, the plurality of image capture devices are lined up, the reference direction of the electronic device 2 is toward north ("N"), the reference image capture device is located in the center of the plurality of image capture devices) (0°).

Figure 3:
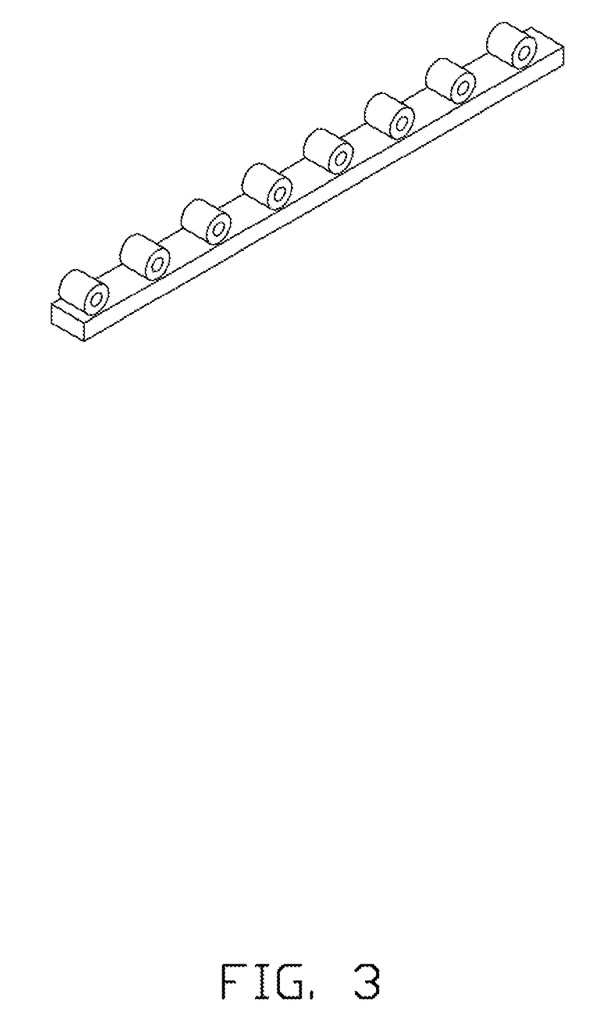
FIG. 3 is a schematic diagram of one embodiment of a number of image capture devices aligned linearly.
Figure 4A:
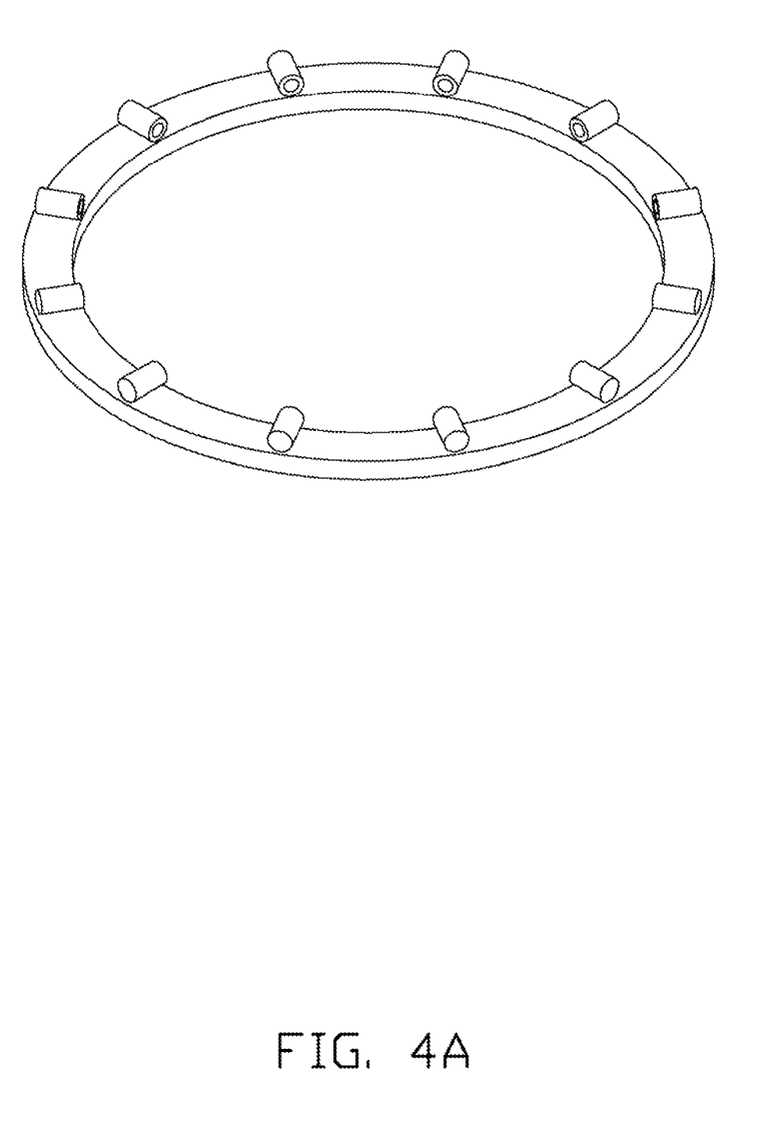
FIG. 4A and FIG. 4B are schematic diagrams of one embodiment of the number of image capture devices aligned in a circle.
Figure 4B:
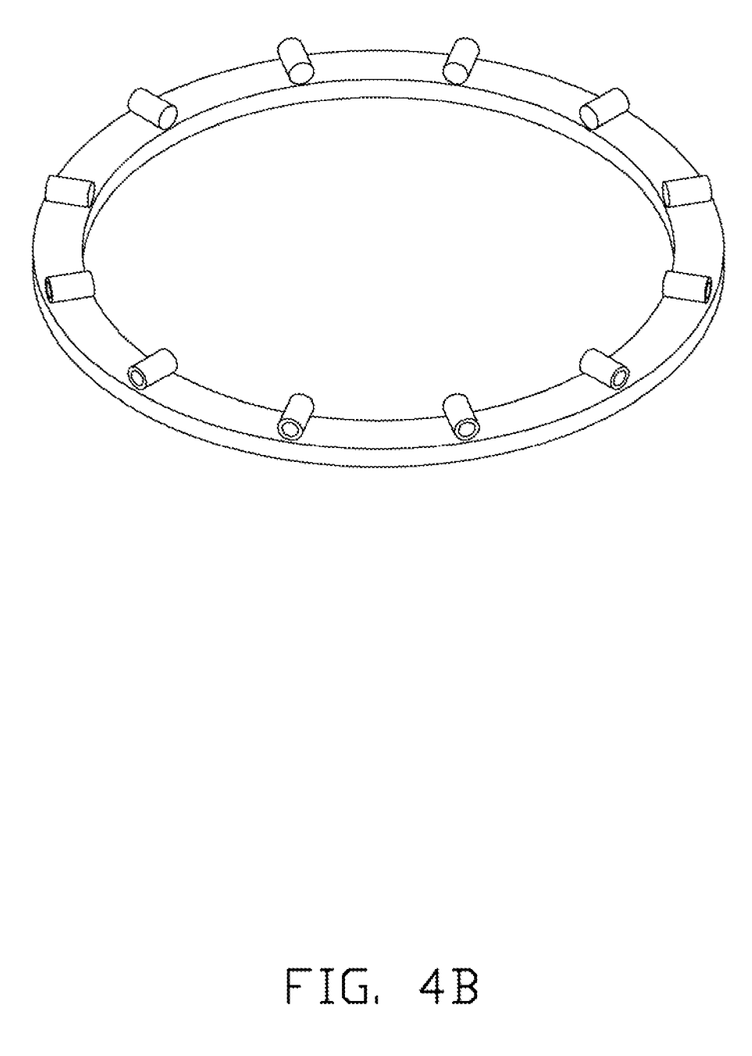
Figure 5A:
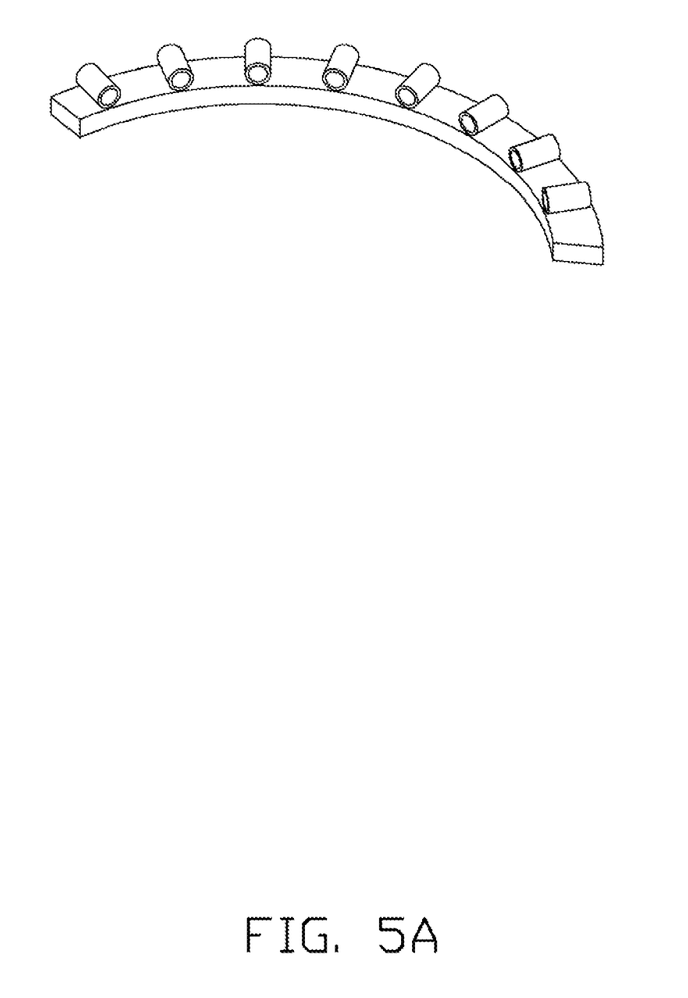
FIG. 5A and FIG. 5B are schematic diagrams of one embodiment of the number of image capture devices aligned in a curve.
Figure 5B:
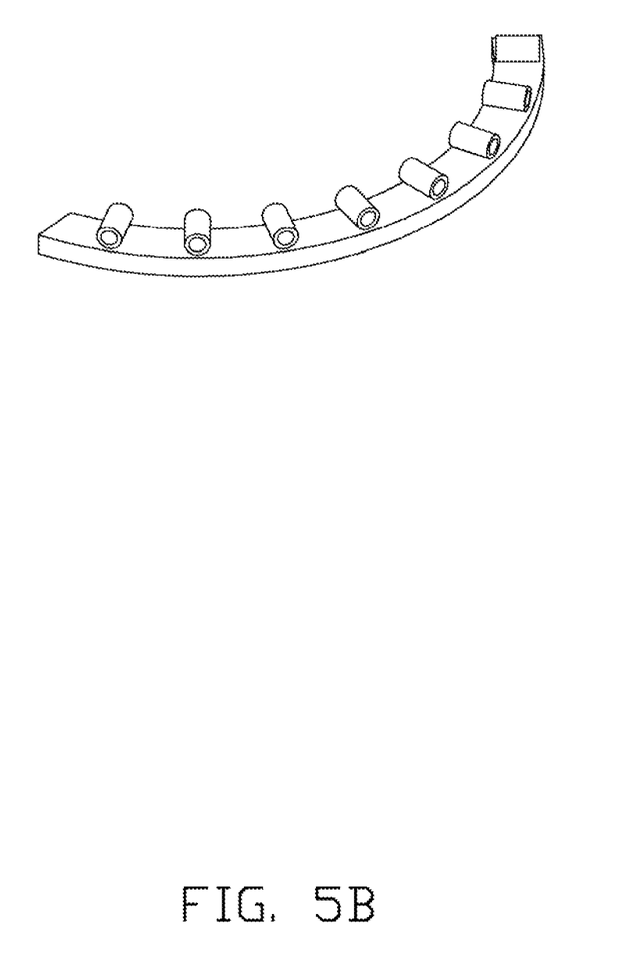

In one embodiment, the plurality of image capture devices are aligned on a plane or a curved surface. The plurality of the image capture devices are aligned in a linear mode, a circle mode, or a curved mode. Referring to FIG. 3, the plurality of the image capture devices are lined up. Referring to FIG. 4A and FIG. 4B, the plurality of the image capture devices are aligned in a circle, with each lens thereof targeted inward in FIG. 4A, and outward in FIG. 4B. Referring to FIG. 5A and FIG. 5B, the plurality of image capture devices are curved, with each lens thereof targeted inward in FIG. 5A, and outward in FIG. 5B.

In block S11, the monitored location switching 20 obtains a current direction of the electronic device 2 detected by the electronic compass chip 23 when the electronic device 2 is moved.

In block S12, the monitored location switching 20 determines a current image capture device corresponding to the current direction of the electronic device 2 from the array of the plurality of image capture devices. A detailed description is as follows.

First, the monitored location switching 20 calculates a movement direction and a movement angle between the reference direction of the electronic device 2 and the current direction of the electronic device 2. Second, the monitored location switching 20 obtains a position of the current image capture device corresponding to the current direction of the electronic device according to the movement direction and the movement angle of the electronic device 2, and a position of the reference image capture device. In one embodiment, the position of the reference image capture device or the current image capture device is an Internet Protocol (IP) address of the reference image capture device or the current image capture device.

Referring to FIG. 6, the plurality of image capture devices are lined up, the reference direction of the electronic device 2 is toward north ("N"), the reference image capture device is located in the center of the plurality of image capture devices (0°). If the movement direction of the electronic device 2 is west ("W"), and "α" represents the movement angle of the electronic device 2.

If 0≤α≤15 degrees, the monitored location switching 20 determines that the electronic device 2 is not moved, and the current image capture device corresponding to the current direction of the electronic device 2 is the preset reference image capture device located in the middle position of the plurality of image capture device.

If 15 degrees≤α<45 degrees, the monitored location switching 20 determines that the current image capture device corresponding to the current direction of the electronic device 2 is the first image capture device (corresponding to 30°) located in a left position of the reference image capture device.

If 45 degrees≤α<75 degrees, the monitored location switching 20 determines that the current image capture device corresponding to the current direction of the electronic device 2 is the second image capture device (corresponding to 60°) located in the left position of the reference image capture device.

If 75 degrees≤α, the monitored location switching 20 determines that the current image capture device corresponding to the current direction of the electronic device 2 is the third image capture device (corresponding to 90°) located in the left position of the reference image capture device.

If the movement direction of the electronic device 2 is east ("E"), and "α" represents the movement angle of the electronic device 2.

If −15 degrees<α≤0, the monitored location switching 20 determines that the electronic device 2 is not moved, and the current image capture device corresponding to the current direction of the electronic device 2 is the preset reference image capture device located in the middle position of the plurality of image capture device.

If −45 degrees<α≤−15 degrees, the monitored location switching 20 determines that the current image capture device corresponding to the current direction of the electronic device 2 is the first image capture device (corresponding to −30°) located in a right position of the reference image capture device.

If −75 degrees<α≤−45 degrees, the monitored location switching 20 determines that the current image capture device corresponding to the current direction of the electronic device 2 is the second image capture device (corresponding to −60°) located in the right position of the reference image capture device.

If α≤−75 degrees, the monitored location switching 20 determines that the current image capture device corresponding to the current direction of the electronic device 2 is the third image capture device (corresponding to −90°) located in the right position of the reference image capture device.

In block S13, the monitored location switching 20 sends a switch command to the current image capture device through the network module 24. The current image capture device sends captured images obtained by a lens of the current image capture device to the electronic device 2.

In block S14, the monitored location switching 20 receives the captured images from the current image capture device, and displays the received captured images on the display screen 22 of the electronic device 2.

Figure 7:
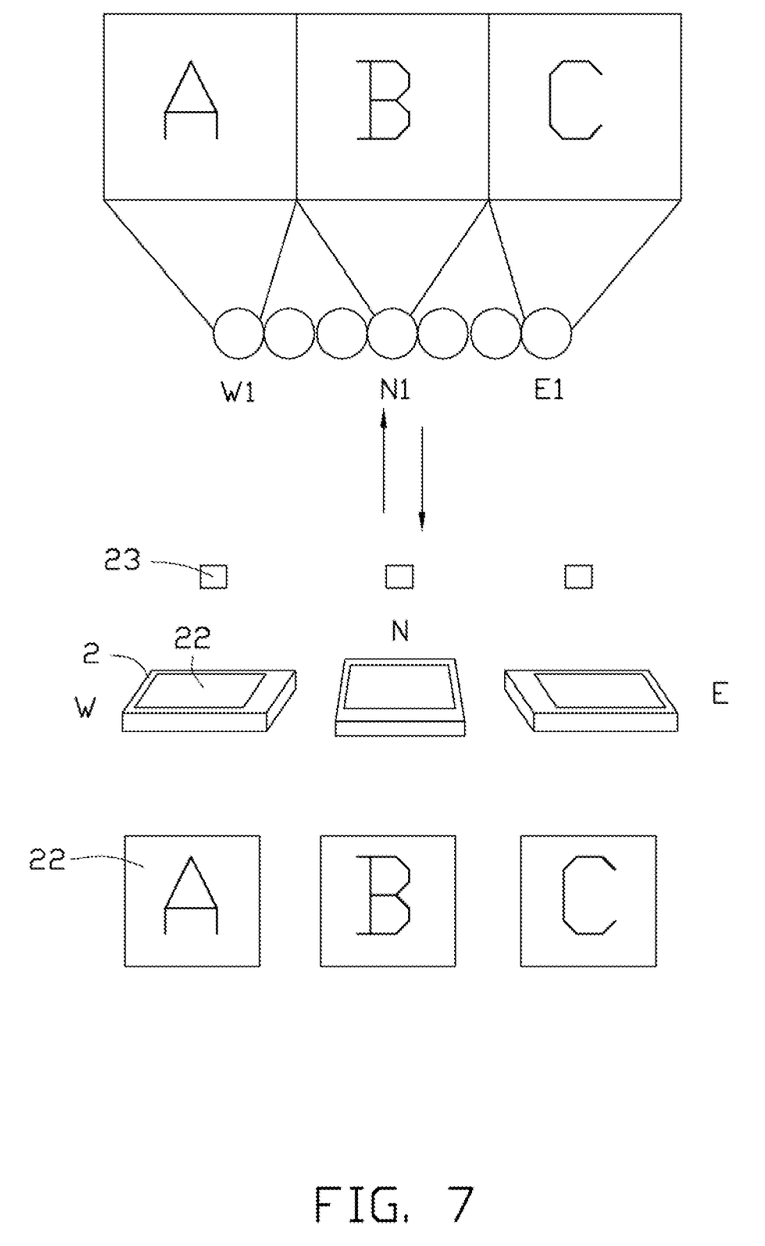
FIG. 7 is an example of switching the monitored location of the plurality of image capture devices by moving the electronic device.

Referring to FIG. 7, supposing that the image capture device "N1" represents the reference image capture device, the reference direction of the electronic device 2 is north. If the current direction of the electronic device 2 is north, the display screen 22 of the electronic device 2 displays captured images acquired from the image capture device "N1." If the movement direction of the electronic device 2 is west, and the movement angle of the electronic device 2 is 90°, the display screen 22 of the electronic device 2 displays captured images acquired from the image capture device "W1." If the movement direction of the electronic device 2 is east, and the movement angle of the electronic device 2 is −90°, the display screen 22 of the electronic device 2 displays captured images acquired from the image capture device "E1."

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for switching a monitored location of a plurality of image capture devices using an electronic device, the monitored location being monitored by the image captured devices, the method comprising:
    setting a reference direction of the electronic device and a corresponding reference image capture device of the plurality of image capture devices;
    obtaining a current direction of the electronic device detected by an electronic compass chip of the electronic device;
    determining a current image capture device corresponding to a movement direction and a movement angle between the reference direction of the electronic device and the current direction of the electronic device from the plurality of image capture devices, wherein the current image capture device is determined when the movement angle of the electronic device is within a preset range of the current image capture device, and the current image capture device is determined as the reference image capture device when the movement angle of the electronic device is less than a preset value; and
    receiving captured images from the current image capture device, and displaying the received captured images on a display screen of the electronic device.

2. The method according to claim 1, wherein the step of determining a current image capture device corresponding to a movement direction and a movement angle between the reference direction of the electronic device and the current direction of the electronic device from the plurality of image capture devices comprises:
    calculating the movement direction and the movement angle between the reference direction of the electronic device and the current direction of the electronic device; and
    obtaining a position of the current image capture device corresponding to the current direction of the electronic device according to the movement direction and the movement angle of the electronic device, and a position of the reference image capture device.

3. The method according to claim 2, wherein the position of the reference image capture device or the current image capture device is an Internet Protocol (IP) address of the reference image capture device or the current image capture device.

4. The method according to claim 1, wherein the plurality of image capture devices are aligned on a plane or a curved surface.

5. The method according to claim 4, wherein the plurality of the image capture devices are aligned linearly, in a circle, or curvedly.

6. An electronic device in communication with a plurality of image capture devices, comprising:
   a display screen;
   a storage device;
   an electronic compass chip;
   at least one processor; and
   one or more modules that are stored in the storage device and are executed by the at least one processor, the one or more modules comprising instructions:
   to set a reference direction of the electronic device and a corresponding reference image capture device of the plurality of image capture devices;
   to obtain a current direction of the electronic device detected by the electronic compass chip;
   to determine a current image capture device corresponding to a movement direction and a movement angle between the reference direction of the electronic device and the current direction of the electronic device from the plurality of image capture devices, wherein the current image capture device is determined when the movement angle of the electronic device is within a preset range of the current image capture device, and the current image capture device is determined as the reference image capture device when the movement angle of the electronic device is less than a preset value; and
   to receive captured images from the current image capture device, and display the received captured images on a display screen of the electronic device.

7. The electronic device according to claim 6, wherein the instruction to determine a current image capture device corresponding to a movement direction and a movement angle between the reference direction of the electronic device and the current direction of the electronic device from the plurality of image capture devices comprises:
   calculating the movement direction and the movement angle between the reference direction of the electronic device and the current direction of the electronic device; and
   obtaining a position of the current image capture device corresponding to the current direction of the electronic device according to the movement direction and the movement angle of the electronic device, and a position of the reference image capture device.

8. The electronic device according to claim 7, wherein the position of the reference image capture device or the current image capture device is an Internet Protocol (IP) address of the reference image capture device or the current image capture device.

9. The electronic device according to claim 6, wherein the plurality of image capture devices are aligned on a plane or a curved surface.

10. The electronic device according to claim 9, wherein the plurality of the image capture devices are aligned linearly, in a circle, or curvedly.

11. A non-transitory storage medium having stored thereon instructions that, when executed by a processor of an electronic device, causes the processor to perform a method for switching a monitored location of a plurality of image capture devices using the electronic device, the monitored location being monitored by the image captured devices, the method comprising:
   setting a reference direction of the electronic device and a corresponding reference image capture device of the plurality of image capture devices;
   obtaining a current direction of the electronic device detected by an electronic compass chip of the electronic device;
   determining a current image capture device corresponding to a movement direction and a movement angle between the reference direction of the electronic device and the current direction of the electronic device from the plurality of image capture devices, wherein the current image capture device is determined when the movement angle of the electronic device is within a preset range of the current image capture device, and the current image capture device is determined as the reference image capture device when the movement angle of the electronic device is less than a preset value;
   sending a switch command to the current image capture device; and
   receiving captured images from the current image capture device, and displaying the received captured images on a display screen of the electronic device.

12. The non-transitory storage medium according to claim 11, wherein the step of determining a current image capture device corresponding to a movement direction and a movement angle between the reference direction of the electronic device and the current direction of the electronic device from the plurality of image capture devices comprises:
   calculating the movement direction and the movement angle between the reference direction of the electronic device and the current direction of the electronic device; and
   obtaining a position of the current image capture device corresponding to the current direction of the electronic device according to the movement direction and the movement angle of the electronic device, and a position of the reference image capture device.

13. The non-transitory storage medium according to claim 12, wherein the position of the reference image capture device or the current image capture device is an Internet Protocol (IP) address of the reference image capture device or the current image capture device.

14. The non-transitory storage medium according to claim 11, wherein the plurality of image capture devices are aligned on a plane or a curved surface.

15. The non-transitory storage medium according to claim 14, wherein the plurality of the image capture devices are aligned linearly, in a circle, or curvedly.

16. The non-transitory storage medium according to claim 11, wherein the medium is selected from the group consisting of a hard disk drive, a compact disc, a digital video disc, and a tape drive.

* * * * *